United States Patent [19]
Guinan

[11] Patent Number: 6,073,113
[45] Date of Patent: Jun. 6, 2000

[54] COMPATIBILITY CHECKING BETWEEN INSTRUMENTS, OPERATIONS AND PROTOCOLS IN ELECTRONIC COMMERCE

[75] Inventor: Daniel J. Guinan, San Mateo, Calif.

[73] Assignee: Sun Microsystems, Inc., Palo Alto, Calif.

[21] Appl. No.: 09/106,601

[22] Filed: Jun. 29, 1998

[51] Int. Cl.$^7$ .................................................. G06F 17/00
[52] U.S. Cl. ............................. 705/26; 705/26; 705/40; 705/39
[58] Field of Search ................... 705/26, 40, 39

[56] References Cited

U.S. PATENT DOCUMENTS

| | | | |
|---|---|---|---|
| 5,850,652 | 12/1998 | Berger et al. | 380/24 |
| 5,889,863 | 3/1999 | Weber | 380/25 |
| 5,903,652 | 5/1999 | Mital | 380/25 |

OTHER PUBLICATIONS

Bahreman, A et al., "Payment method negotiation service—framework and programming specification" Proc. Of the 2$^{nd}$ Usenix Workshop on Electronic Commerce, Nov. 18–21, 1996, pp. 299–314, XP002111239.

VeriFone & Netscape Internet Alliance, Newsbytes, Jan. 24, 1996.

*Primary Examiner*—Stephen R. Tkacs
*Assistant Examiner*—Phillip Groutt
*Attorney, Agent, or Firm*—Park & Vaughen LLP

[57] ABSTRACT

The present invention provides a modular infrastructure for electronic commerce that allows electronic financial instruments to work with a variety of different protocols. One embodiment of the present invention receives a request for an operation, and checks compatibility between the operation and available protocols for the operation to determine a set of compatible protocols. Next, the system checks compatibility between the set of compatible protocols and available instruments for the operation to determine a set of compatible instruments. If the set of compatible instruments includes at least one instrument, the system selects a compatible instrument and a corresponding compatible protocol, and uses this instrument and protocol to perform the operation. In a variation on the above embodiment, the act of selecting the compatible protocol and the compatible instrument entails presenting the set of compatible protocols and the set of compatible instruments to a user, and allowing the user to select the compatible protocol and the compatible instrument for the operation.

25 Claims, 6 Drawing Sheets

```
public boolean isCompatibleWith(Class beanClass)
{
    // Protocols only test the compatibility of
    // Instruments, for all other types, throw an
    // exception.
    if(!Instrument.class.isAssignableFrom(beanClass))
        throw new InvalidCommerceBeanException();

if(!RequiredInterface_1.class.isAssignableFrom(beanClass))
        return false;

// continue testing for each required interface if(!RequiredInterface_n.class.isAssignableFrom(beanClass))
        return false;

// All of our interface requirements are met, return true.

return true;
}
```

EXECUTABLE SET = (A X B) ∩ C = {VISA, SET} , {ATM, ATM}

FIG. 7

COMPATIBILITY CHECKING BETWEEN INSTRUMENTS, OPERATIONS AND PROTOCOLS IN ELECTRONIC COMMERCE

COPYRIGHT NOTICE PURSUANT TO 37 C.F.R. 1.71(e)

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The present invention relates to mechanisms for facilitating transactions in electronic commerce. More specifically, the present invention relates to checking compatibility between operations, protocols and instruments involved in electronic commerce operations.

The advent of computer networks, such as the Internet and the rise of the World Wide Web have led to an explosion in the development of applications, such as websites, that facilitate rapid dissemination of information. Using the World Wide Web, it is presently possible to instantaneously access information on the weather in Africa or stock prices in Tokyo with a only a few clicks of a computer mouse. As the Internet continues to evolve, it no longer merely functions as a mechanism for dissemination of information; it is also becoming an infrastructure that supports electronic commerce. The Internet is now commonly used to sell items such as books, software and compact discs.

An electronic commerce transaction, such as a sale, is typically accomplished by allowing a user on a client computer system to remotely browse through a web site on a server computer system in order to select an item to purchase. Once the item is selected, the user purchases the item by entering a credit card number into a form, and sending the form to the website.

People are now beginning to develop more sophisticated mechanisms to facilitate electronic commerce. Financial instruments, such as credit cards, debit cards and cash, are presently being cast into electronic form. For example, instead of entering a credit card number into a form, a purchaser will be able to select an icon representing a credit card or, alternatively, an icon representing electronic cash. These recent developments have given rise to a large number of different protocols, which are currently being developed and used to support electronic commerce transactions. For example, an electronic transaction might make use of the Secure Electronic Transactions (SET) protocol, the Automatic Teller Machine (ATM) protocol, the Secure Sockets Layer (SSL) protocol, or the Mondex protocol. A user desiring to perform transactions with different entities that make use of these different protocols must presently provide a different version of a financial instrument, such as a credit card, for each different protocol. Additionally, as new protocols come into existence, a user must modify existing instruments or produce new instruments to make use of the new protocols. Providing many different versions of a financial instrument for different protocols is burdensome and greatly complicates electronic commerce transactions.

SUMMARY

The present invention provides a modular infrastructure for electronic commerce that allows electronic financial instruments to work with a variety of different protocols. One embodiment of the present invention receives a request for an operation, and checks compatibility between the operation and available protocols for the operation to determine a set of compatible protocols. Next, the system checks compatibility between the set of compatible protocols and available instruments for the operation to determine a set of compatible instruments. If the set of compatible instruments includes at least one instrument, the system selects a compatible instrument and a corresponding compatible protocol, and uses this instrument and protocol to perform the operation. Note that the compatibility checking takes place dynamically—after compilation. In a variation on the above embodiment, the act of selecting the compatible protocol and the compatible instrument entails presenting the set of compatible protocols and the set of compatible instruments to a user, and allowing the user to select the compatible protocol and the compatible instrument for the operation.

Thus, the present invention provides a modular infrastructure that allows modular financial instruments to be used with different protocols to perform operations in electronic commerce.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Centralized Processing System

Figure 1:
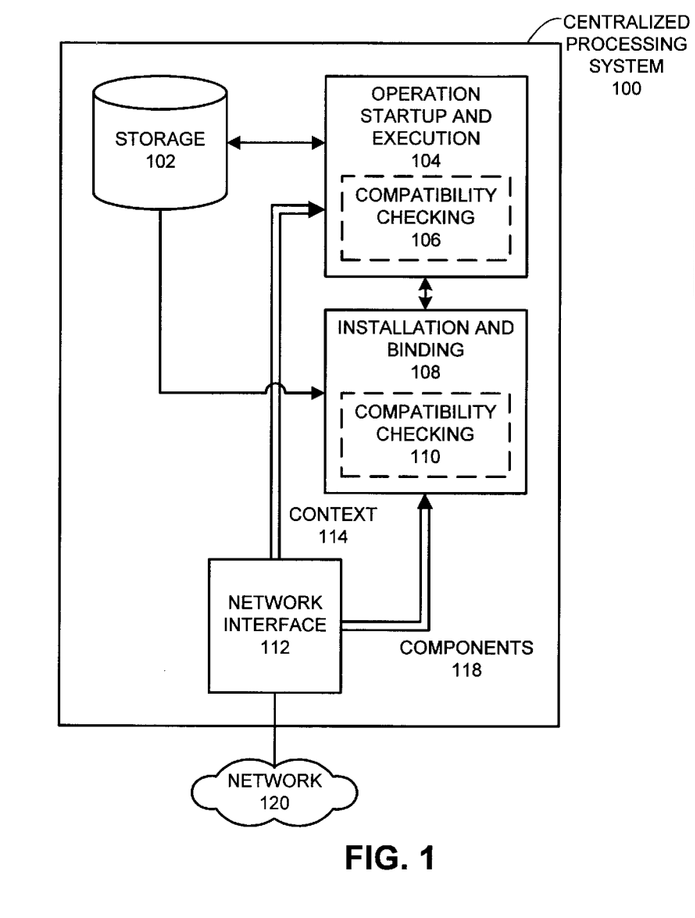
FIG. 1 is a block diagram illustrating a centralized processing system in accordance with an embodiment of the present invention.

FIG. 1 is a block diagram illustrating a centralized processing system 100 in accordance with an embodiment of the present invention. In the embodiment illustrated in FIG. 1, centralized processing system 100 includes storage unit 102, network interface unit 112, operation startup and execution unit 104 and installation and binding unit 108. Centralized processing system 100 also includes a processor (not shown) through which operation startup and execution unit 104 and installation and binding unit 108 operate. Storage unit 102 may be any type of storage device for data and/or code, including, but not limited to, a magnetic storage device, a semiconductor memory device, and an optical storage device. Storage unit 102 is coupled to both operation startup and execution unit 104 and installation and binding unit 108. Network interface unit may be any type of mechanism that facilitates communication across a computer network. In the illustrated embodiment, network interface unit 112 is coupled to network 120, and includes a network interface controller as well as a software driver for communicating across network 120. Network 120 generally refers to any type of wire or wireless link between computers, including, but not limited to, a local area network, a wide area network, or a combination of networks. In one embodiment of the present invention, network 120 includes the Internet.

Operation startup and execution unit 104 controls the initialization and execution of operations on centralized processing system 100. Operation startup and execution unit 104 includes compatibility checking mechanism 106, which tests for compatibility between various operations, protocols and instruments at operation runtime. Operation startup and execution unit 104 receives context information 114 from network interface unit 112. This context information 114 includes parameters for an operation that may be generated, for example, by a purchaser filling out a purchase form on a web site.

Installation and binding unit 108 controls both the installation and binding of objects, such as objects defined within an object-oriented programming system, that represent operations, protocols and instruments, in accordance with an embodiment of the present invention. Installation and binding unit 108 includes compatibility checking mechanism 110, for checking compatibility between operation, protocol and instrument objects as these objects are installed and bound into the system. Installation and binding unit 108 receives components 118 through network interface unit 112. Components 118 may include instruments, protocols and operations involved in electronic commerce applications.

During operation, context information 114 is loaded across network 120 into operation startup and execution unit 104. This context information provides parameters, perhaps gathered from a web site, that are used to initiate an operation within operation startup and execution unit 104. Compatibility checking may occur at this point, when operations are initiated. Next, components 118 are loaded across network 120 into installation and binding unit 108. Installation and binding unit 108 installs the components 118 into the system. Compatibility checking may additionally occur during this installation and binding process instead of, or in addition to, compatibility checking that occurs at other times.

Distributed Processing System

Figure 2:
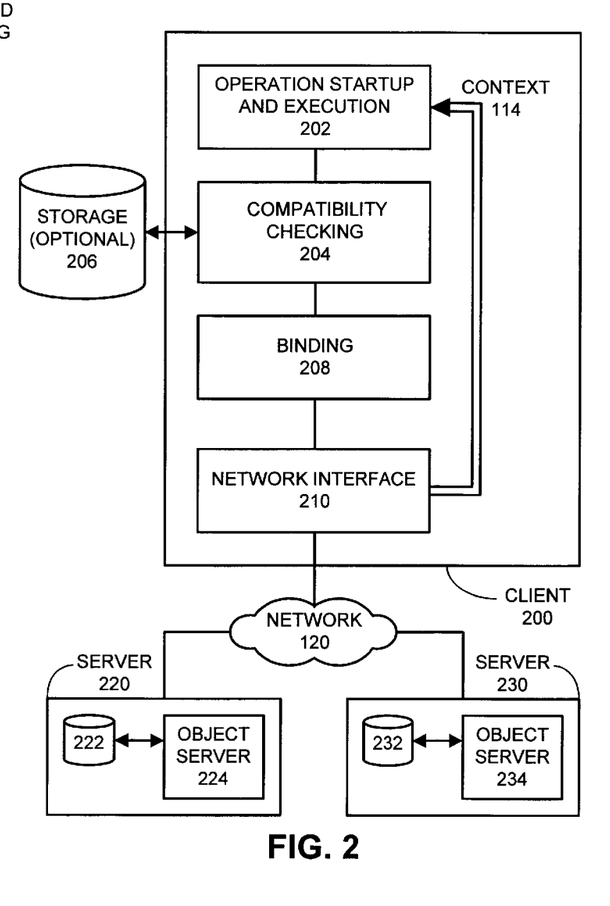
FIG. 2 is a block diagram illustrating a distributed processing system in accordance with an embodiment of the present invention.

FIG. 2 is a block diagram illustrating a distributed processing system including client 200 and servers 220 and 230 in accordance with an embodiment of the present invention. Client 200 may be any entity that makes requests on a server, such as servers 220 and 230, for services involving computational or data storage resources. Servers 220 and 230 can be any entity that includes a mechanism for servicing requests from a client, such as client 200, for services involving computational or data storage resources. Client 200 is coupled to servers 220 and 230 through network 120, which is described above.

Server 220 includes object server 224, and storage unit 222. Object server 224 provides objects defined within an object-oriented programming system that can be accessed across network 120. Storage unit 222 may be any type of storage device for data and/or code, including, but not limited to, a magnetic storage device, a semiconductor memory device, and an optical storage device. Note that storage unit 222 is optional; in some embodiments, server 220 may not include storage unit 222.

Similarly, server 230 includes object server 234 and storage unit 232. Object server 234 provides objects defined within an object-oriented programming system that can be accessed across network 120. Storage unit 232 may be any type of storage device for data and/or code, including, but not limited to, a magnetic storage device, a semiconductor memory device, and an optical storage device. Storage unit 232 is optional; in some embodiments, server 230 does not include storage unit 232.

Client 200 includes operation startup and execution unit 202, compatibility checking unit 204, binding mechanism 208 and network interface unit 210. Operation startup and execution unit 202 controls the initialization and running of operations on client 200. Operation startup and execution unit 202 receives context information 114 from network interface unit 210. This context information 114 includes parameters, perhaps gathered from a web site, which can be used to initiate an operation.

Operation startup and execution unit 202 is coupled to compatibility checking unit 204, which tests for compatibility between various operations, protocols and instruments, at either operation run time or at object installation time, or a combination of both times. Compatibility checking unit 204 may be coupled to optional storage unit 206, which allows compatibility checking unit 204 to lookup pre-recorded compatibility information, or to record discovered compatibility information between operations, protocols and instruments. Storage unit 206 may be any type of computer readable storage medium for data and/or code, including, but not limited to, semiconductor memory devices, magnetic and optical storage devices such as disk drives, magnetic tape, CDs (compact discs) and DVDs (digital video discs), and computer instruction signals embodied in a carrier wave.

Compatibility checking unit 204 is additionally coupled to binding mechanism 208. Binding mechanism 208 facilitates distributed binding, using protocols such as RMI or CORBA, to objects located on remote servers, such as object servers 224 and 234. Binding mechanism 208 is coupled to network 120 through network interface unit 210. In the illustrated embodiment, network interface unit 210 is coupled to network 120, and includes a network interface controller as well as a software driver for communicating across network 120.

During operation, context information 114 is loaded across network 120 into operation startup and execution unit 202. This context information 114 provides parameters that can be used to initiate an operation within operation startup and execution unit 104. For example, context information may be gathered from a website for a purchase operation. Compatibility checking may occur at this time, when operations are initiated. Next, distributed components are bound to applications within client 200 through binding mechanism 208. Compatibility checking between instruments operations and protocols may alternatively happen at this time, during this binding process.

Electronic Commerce Framework

Figure 3:
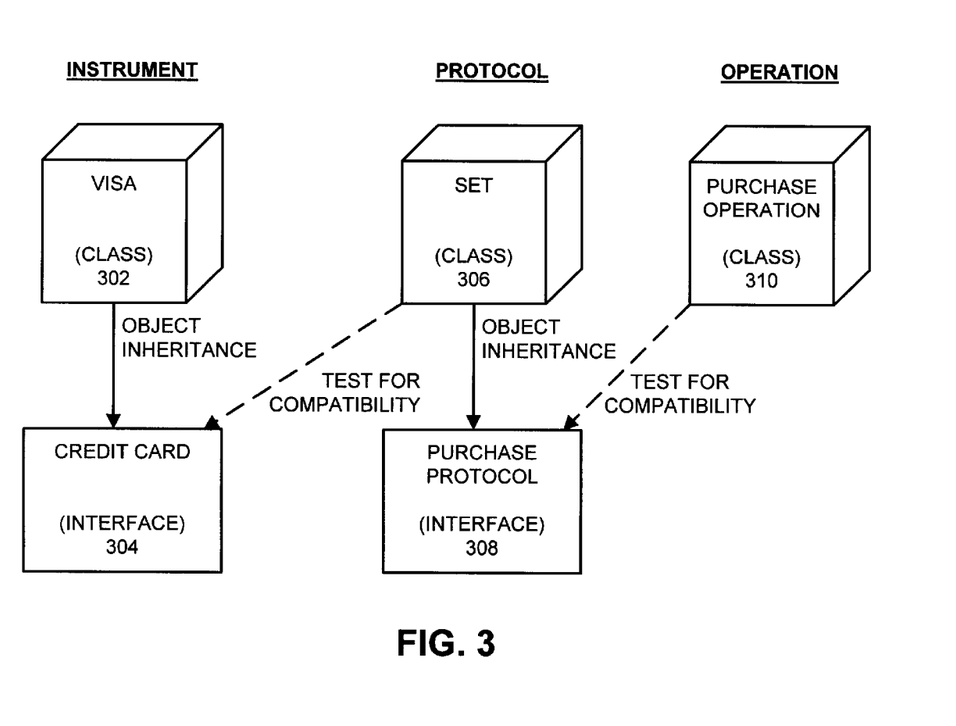
FIG. 3 is a diagram illustrating the instrument, operation and protocol framework for electronic commerce in accordance with an embodiment of the present invention.

FIG. 3 is a diagram illustrating an example of the instrument, operation and protocol framework for electronic commerce transactions in accordance with an embodiment of the present invention. (In FIG. 3, the three-dimensional boxes 302, 306 and 310 represent concrete classes, whereas the two-dimensional boxes 304 and 308 represent abstract classes as defined within an object-oriented programming system, such as the Java™ programming language developed by SUN Microsystems, Inc. of Palo Alto, Calif.)

In the illustrated embodiment, the classes are divided into instruments, operations and protocols. Instruments correspond to various financial instruments and accounts upon which financial transactions are performed. Instruments may include, but are not limited to, electronic credit cards, electronic debit cards, and electronic cash, and other financial instruments, such a checking accounts, savings accounts and stock brokerage accounts.

Operations can include any type of financial operation that ultimately involves one or more instruments. For example, a "purchase" operation may involve a credit card instrument or an electronic cash instrument. In another example, a "buy stock" operation may involve a stock brokerage account.

Protocols represent protocols that can be used to perform operations. For example, the Secure Electronic Transactions (SET) protocol can be used to perform credit card transactions; the ATM protocol can be used to perform transactions from automatic teller machines; the Mondex protocol can be used to perform transactions involving Mondex smart cards; and the Secure Socket Layer (SSL) protocol can be used to carry out transactions generally involving secure communications across a computer network.

The example illustrated in FIG. 3 presents purchase operation class 310, which interacts with purchase protocol interface 308, which is associated with SET class 306. SET class 306 interacts with credit card interface 304, which is associated with VISA™ class 302.

Under the framework illustrated in FIG. 3, compatibility is tested from left to right. The purchase operation object tests the protocol object for adherence to the purchase protocol. The SET protocol tests instrument objects for adherence to the credit card interface. This compatibility testing entails determining whether a protocol can use the methods and data of an instrument, and whether an operation can use the methods and data of a protocol.

Process or Determining Compatibility

Figure 4:
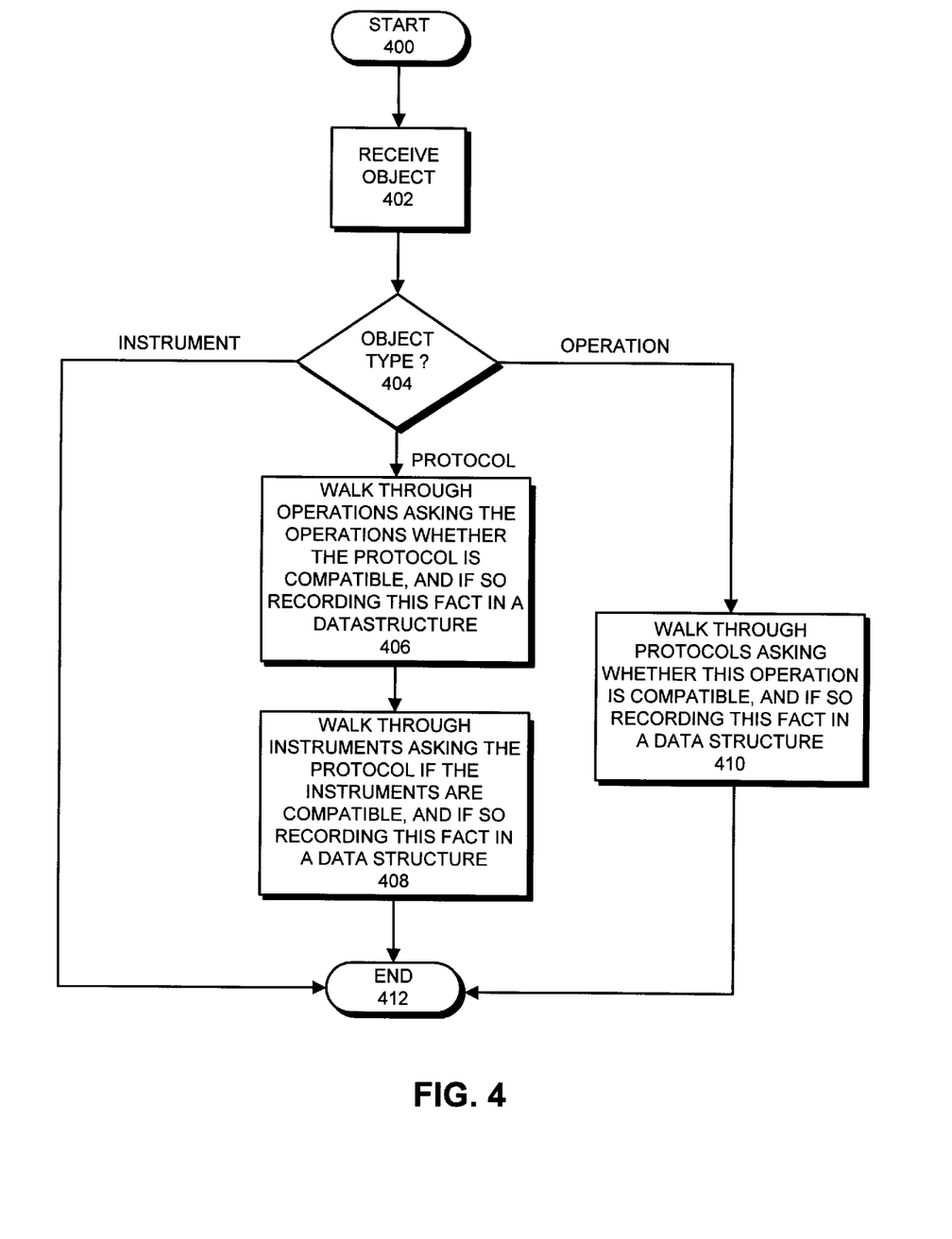
FIG. 4 is a flow chart illustrating some of the operations involved in determining and recording compatibility information between operations, instruments and protocols in accordance with an embodiment of the present invention.

FIG. 4 is a flow chart illustrating some of the operations involved in determining and recording compatibility information between operations, instruments and protocols in accordance with an embodiment of the present invention. FIG. 4 illustrates the process of compatibility checking during object installation and binding. Any compatibility that is detected during this process is stored in a data structure for later use during run time. Alternatively, compatibility checking may take place when operations are initiated, during run time.

In FIG. 4, the system starts at state 400 and proceeds to state 402. In state 402, the system receives an object to be bound into the system. As noted above, the object can include an operation, a protocol or an instrument. The system next proceeds to state 404. In state 404, the system determines, whether the object represents an operation, an instrument, or a protocol. If it represents an operation, the system proceeds to state 410. If it represents a protocol, the system proceeds to state 406. If it represents an instrument, no compatibility checking is required, so the system proceeds to state 412, which is an end state.

In state 410, the object is an operation. In this case, the system walks through each of the available protocols and determines if the protocols are compatible with the operation. If so, the compatibility is recorded in a data structure for later retrieval at run time. The system next proceeds to state 412, which is an end state.

In state 406, the object is a protocol. In this case, the system walks through all of the available operations and asks each operation if this protocol is compatible with it. If so, the compatibility is recorded in a data structure for later retrieval at run time. The system next proceeds to state 408. In state 408, the system walks through each of the available instruments asks the protocol if the instrument is useable by it. If so, the compatibility is recorded in the data structure. The system next proceeds to state 412, which is an end state.

Compatibility Test

Figure 5:
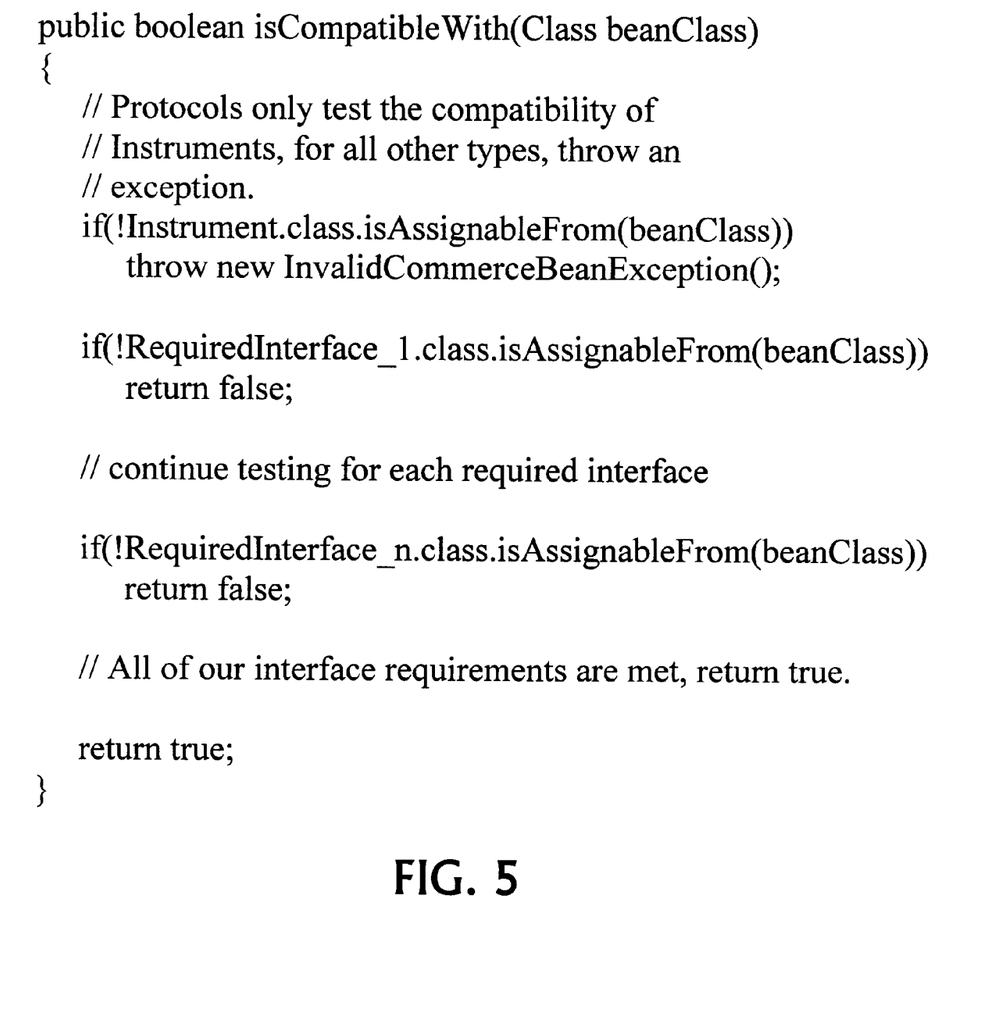
FIG. 5 is a diagram illustrating an exemplary piece of computer code that tests for compatibility between a protocol and a set of instruments in accordance with an embodiment of the present invention.

FIG. 5 is a diagram illustrating an exemplary piece of computer code in the Java™ programming language that tests for compatibility between a protocol and a set of instruments in accordance with an embodiment of the present invention. The code illustrated in FIG. 5 receives a parameter "beanClass," which specifies an instrument to test the protocol against. (Note that Java Beans are part of the Java programming language and supporting interfaces developed by SUN Microsystems, Inc. of Palo Alto, Cailf.). The code first checks to see that the parameter represents an instrument. If not, it throws an exception to indicate that the parameter is invalid. Next, the code tests to see that all required interfaces are assignable from "beanClass." If they are all assignable, the code returns true. Otherwise, the code returns false. Note that a similarly structured piece of code can be used to test for compatibility between operations and protocols.

Operation Performance

Figure 6:
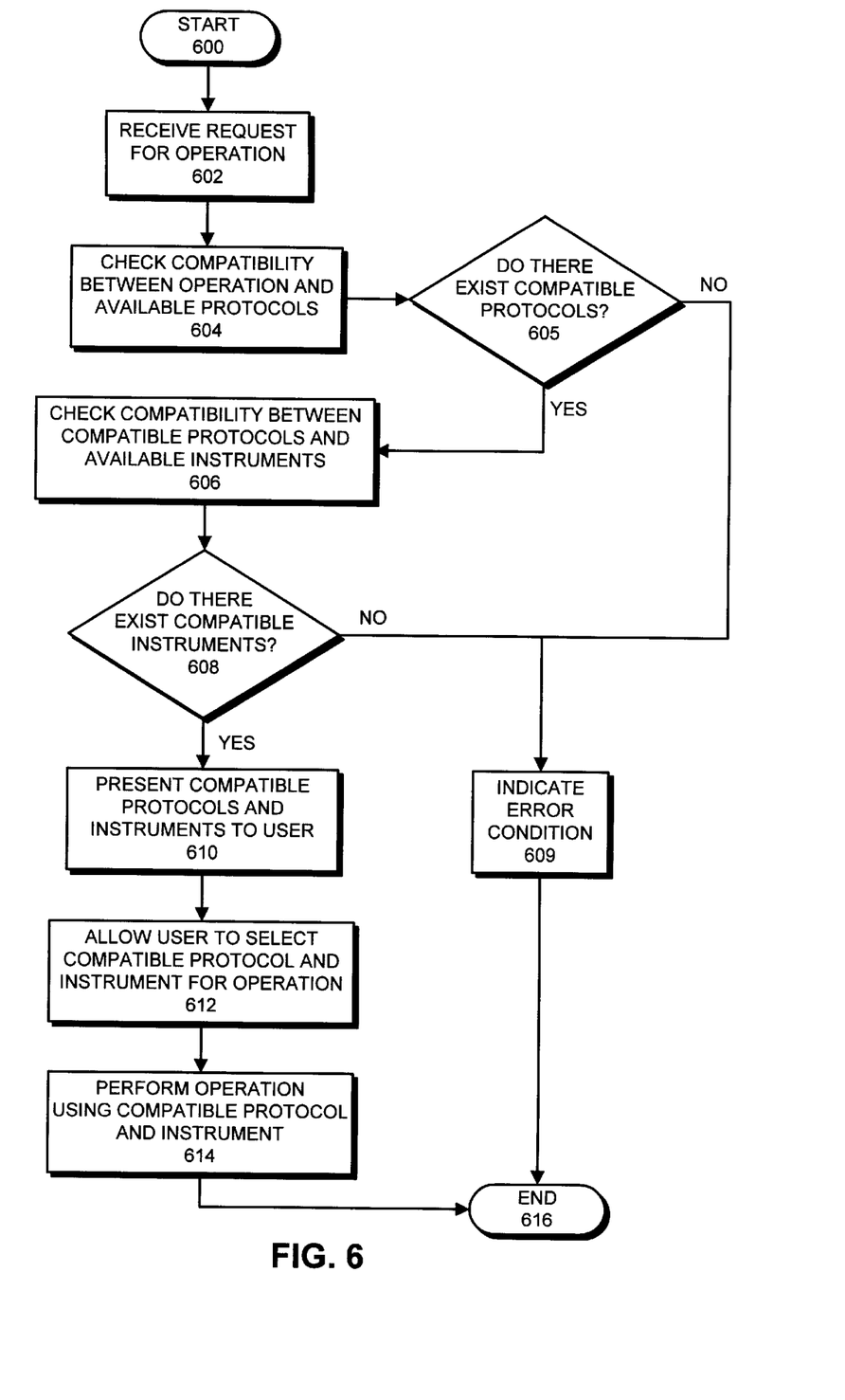
FIG. 6 is a flow chart illustrating some of steps involved in performing an operation in accordance with an embodiment of the present invention.

FIG. 6 is a flow chart illustrating some of steps involved in performing an operation in accordance with an embodiment of the present invention. The system starts at state 600 and proceeds to state 602. In state 602, the system receives a request to perform an operation. The system next proceeds to state 604. In state 604, the system checks compatibility the between the operation and available protocols for the operation. The set of available protocols can be determined by determining which protocols can be used with all entities involved in the operation.

The checking for compatibility can be performed in a number of ways. In one embodiment, the compatibility determinations are carried out at object binding time, and are recorded in a data structure, such as a table or a tree (as is discussed above with reference to FIG. 4). In this case, checking for compatibility entails performing a simple lookup in the data structure. In another embodiment, compatibility determinations are performed at run time.

The system next proceeds to state 605. In state 605, the system asks if any compatible protocols exist. If so, the system proceeds to state 606. Otherwise, the system proceeds to state 609, in which the system indicates an error condition. In another embodiment of the present invention, if no compatible protocols can be found locally, the system attempts to locate compatible protocols across network 120.

In state 606, the system checks compatibility between the previously determined compatible protocols and available instruments for the protocol. Again, this compatibility checking may involve simple lookups into a data structure, or alternatively, through compatibility determinations made at run time.

The system next proceeds to state 608. In state 608, the system asks if any compatible instruments exist. If so, compatible protocols must also exist because the compatibility testing in state 606 involved only compatible protocols. In this case, the system proceeds to state 610. Otherwise, the system proceeds to state 609, in which the system indicates an error condition. After state 609, the system proceeds to state 616, which is an end state.

In state 610, the system presents the set of compatible instruments and protocols for the operation to a user requesting the operation. In one embodiment, this presentation takes place through a graphical user interface. The system next proceeds to state 612. In state 612, the system allows the user to select a compatible instrument and protocol combination for the operation. In another embodiment, the compatible instrument and protocol combination is selected automatically, without receiving selections from a user, by the system using a set of default rules. The system next proceeds to state 614. In state 614, the system performs the operation using the instrument and the protocol selected in state 612. The system next proceeds to state 616, which is an end state. Note that the above-described steps for processing an operation are repeated for subsequent operations received by the system.

Process of Selecting Instruments

Figure 7:
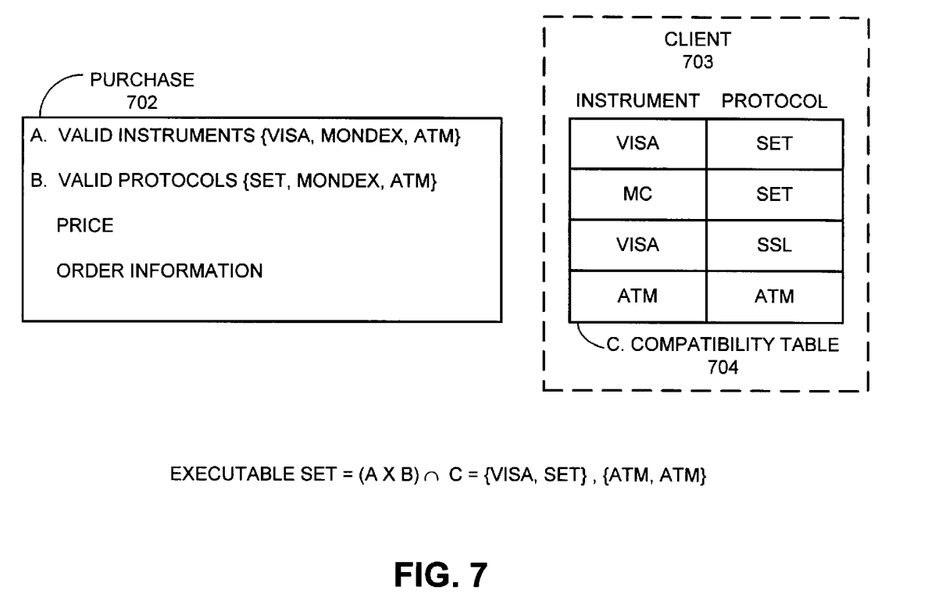
FIG. 7 illustrates an example of the process of selecting instruments and protocols for an operation in accordance with an embodiment of the present invention.

FIG. 7 provides an example of the process of selecting instruments and protocols for an operation in accordance with an embodiment of the present invention. In this example, a purchase operation 702 is received from a server, such a web server that implements a web site for selling software. Purchase operation 702 contains a listing of the instruments that are supported by the server. In this example, the list includes VISA™, Mondex and ATM. It also includes a listing of the protocols that are supported by the server, including SET, Mondex and ATM. Purchase operation 207 additionally includes other information, such as price, and other order information.

Client 703 includes compatibility table 704, which is a data structure containing valid instrument/operation pairs for the operation that are supported by client 703. For purposes of this simple example only, these instrument and operation combinations are assumed to be compatible with the operation. In the illustrated example, compatibility table 704 includes, VISA™/SET, MC/SET, VISA™/SSL and ATM/ATM. Note that MC is an abbreviation for the credit card brand "Mastercard™."

An executable set of protocol instrument pairs is determined by taking the cross product of the instruments and the protocols for purchase operation 702 that are supported by the server, and taking the intersection of this cross product with the instrument protocol pairs from compatibility table 704. In the example illustrated in FIG. 7, this yields two pairs, "VISA™/SET "and "ATM/ATM." A user requesting the purchase is presented with these two options on a graphical interface, and is allowed to select one of these options with which to consummate the purchase. The system uses this selection to perform the operation.

The foregoing descriptions of embodiments of the invention have been presented for purposes of illustration and description only. They are not intended to be exhaustive or to limit the invention to the forms disclosed. Many modifications and variations will be apparent to practitioners skilled in the art. Accordingly, the above disclosure is not intended to limit the invention. The scope of the invention is defined by the appended claims.

What is claimed is:

1. A method for performing an operation in electronic commerce, comprising:

receiving a request for the operation;

checking compatibility between the operation and available protocols for the operation to determine a set of compatible protocols;

checking compatibility between the set of compatible protocols and available instruments for the operation to determine a set of compatible instruments;

wherein a given instrument can be configured to operate with more than one protocol; and if the set of compatible instruments includes at least one instrument, selecting a compatible protocol and a compatible instrument, and performing the operation using the compatible protocol and compatible instrument.

2. The method of claim 1, wherein the operation includes a purchase operation.

3. The method of claim 1, wherein the available instruments for the operation include, an electronic debit card, an electronic credit card and electronic cash.

4. The method of claim 1, where the available protocols for the operation include the SET and ATM protocols.

5. The method of claim 1, wherein the available protocols for the operation are protocols that can be used by all entities involved in the operation.

6. The method of claim 1, wherein the available instruments for the operation are instruments that can be used by all entities involved in the operation.

7. The method of claim 1, wherein selecting the compatible protocol and the compatible instrument for the operation comprises:

presenting the set of compatible protocols and the set of compatible instruments to a user participating in the operation; and allowing the user to select the compatible protocol and the compatible instrument for the operation.

8. The method of claim 1, wherein selecting the compatible protocol and the compatible instrument for the operation comprises automatically selecting the compatible instrument and the compatible protocol based upon a set of default selection rules.

9. The method of claim 1, wherein checking compatibility between the operation and the available protocols for the operation includes retrieving compatibility information from a storage structure containing pre-computed compatibility information.

10. The method of claim 1, wherein checking compatibility between the set of compatible protocols and the available instruments for the operation includes retrieving compatibility information from a storage structure containing pre-computed compatibility information.

11. The method of claim 1, further comprising if the set of compatible instruments is empty, indicating an error condition.

12. A computer readable storage medium storing instructions that when executed by a computer cause the computer to perform a method for performing an operation in electronic commerce, comprising:

receiving a request for the operation;

checking compatibility between the operation and available protocols for the operation to determine a set of compatible protocols;

checking compatibility between the set of compatible protocols and available instruments for the operation to determine a set of compatible instruments;

wherein a given instrument can be configured to operate with more than one protocol; and if the set of compatible instruments includes at least one instrument, selecting a compatible protocol and a compatible instrument, and performing the operation using the compatible protocol and compatible instrument.

13. A method for determining compatibility between operations, protocols and instruments involved in electronic commerce transactions, comprising:

receiving an object;

if the object represents a protocol, determining compatibility between the protocol and a set of available instruments, determining compatibility between the protocol and a set of available operations, and recording any determined compatibilities in a lookup structure; and if the object represents an operation, determining compatibility between the operation and a set of available protocols, and recording any determined compatibilities in a lookup structure;

wherein a given instrument can be configured to operate with more than one protocol.

14. An apparatus that performs an operation in electronic commerce, comprising:

a receiving mechanism that receives a request for the operation;

a compatibility checking mechanism, coupled to the receiving mechanism that checks compatibility between the operation and available protocols for the operation to determine a set of compatible protocols, and that checks compatibility between the set of compatible protocols and available instruments for the operation to determine a set of compatible instruments;

wherein a given instrument can be configured to operate with more than one protocol;

a selection mechanism, coupled to the compatibility checking mechanism, that selects a compatible protocol and a compatible instrument; and an execution mechanism, coupled to the selection mechanism, that executes the operation using the compatible protocol and compatible instrument for the operation.

15. The apparatus of claim 14, wherein the operation includes a purchase operation.

16. The apparatus of claim 14, wherein the available instruments for the operation include, an electronic debit card, an electronic credit card and electronic cash.

17. The apparatus of claim 14, where the available protocols for the operation include the SET and ATM protocols.

18. The apparatus of claim 14, wherein the available protocols for the operation are protocols that can be used by all entities involved in the operation.

19. The apparatus of claim 14, wherein the available instruments for the operation are instruments that can be used by all entities involved in the operation.

20. The apparatus of claim 14, wherein the selection mechanism is configured to present the set of compatible protocols and the set of compatible instruments to a user participating in the operation, and to allow the user to select the compatible protocol and the compatible instrument for the operation.

21. The apparatus of claim 14, wherein the selection mechanism is configured to automatically select the compatible instrument and the compatible protocol based upon a set of default selection rules.

22. The apparatus of claim 14, wherein the compatibility checking mechanism is configured to retrieve compatibility information from a storage structure containing pre-computed compatibility information.

23. The apparatus of claim 14, further comprising an error indicator, coupled to the compatibility checking mechanism, that is configured to indicate an error condition if the set of compatible instruments is empty.

24. An apparatus that performs an operation in electronic commerce, comprising:

a receiving means for receiving a request for the operation;

a compatibility checking means, coupled to the receiving means, for checking compatibility between the operation and available protocols for the operation to determine a set of compatible protocols, and for checking compatibility between the set of compatible protocols and available instruments for the operation to determine a set of compatible instruments;

wherein a given instrument can be configured to operate with more than one protocol;

a selection means, coupled to the compatibility checking means, for selecting a compatible protocol and a compatible instrument; and an execution means, coupled to the selection means, that executes the operation using the compatible protocol and compatible instrument for the operation.

25. A computer readable storage medium containing a data structure for storing compatibility information between instruments, operations and protocols involved in electronic commerce transactions, the data structure comprising:

a computer-readable storage medium:

a data storage area within the computer-readable storage medium for storing information on compatibility between instruments, protocols and operations involved in electronic commerce operations;

an indexing structure within the computer-readable storage medium into the data storage area that receives an operation and looks up compatible protocols based upon the operation; and an indexing structure within the computer-readable storage medium into the data storage area that receives a protocol and looks up compatible instruments based upon the protocol;

wherein a given instrument can be configured to operate with more than one protocol.

* * * * *